United States Patent
Suzuki et al.

(10) Patent No.: US 7,418,563 B2
(45) Date of Patent: *Aug. 26, 2008

(54) METHOD FOR CONTROLLING STORAGE DEVICE CONTROLLER, STORAGE DEVICE CONTROLLER, AND PROGRAM

(75) Inventors: Susumu Suzuki, Ooiso (JP); Masanori Nagaya, Tokyo (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 11/546,328

(22) Filed: Oct. 12, 2006

(65) Prior Publication Data

US 2007/0028066 A1 Feb. 1, 2007

Related U.S. Application Data

(63) Continuation of application No. 11/389,056, filed on Mar. 27, 2006, now Pat. No. 7,334,097, which is a continuation of application No. 10/684,210, filed on Oct. 10, 2003, now Pat. No. 7,093,087.

(30) Foreign Application Priority Data

Dec. 18, 2002 (JP) .............................. 2002-366374

(51) Int. Cl.
    G06F 12/00 (2006.01)
(52) U.S. Cl. ...................................... 711/161; 707/204
(58) Field of Classification Search ................. 711/161; 707/204

See application file for complete search history.

(56) References Cited

U.S. PATENT DOCUMENTS 5,692,155 A 11/1997 Iskiyan et al.
6,185,601 B1 2/2001 Wolff (Continued)

FOREIGN PATENT DOCUMENTS

EP 1039387 9/2000

(Continued)

OTHER PUBLICATIONS

Tannenbaum, Andrew S., "Structured Computer Organization", 1984, Prentice-Hall, Inc., 2$^{nd}$ Ed., pp. 10-12.

(Continued)

*Primary Examiner*—Kevin Ellis
*Assistant Examiner*—Jared I Rutz
(74) *Attorney, Agent, or Firm*—Mattingly, Stanger, Malur & Brundidge, P.C.

(57) ABSTRACT

Disclosed herein is a method for controlling a storage device controller connected to a storage device provided with a plurality of storage volumes for storing data respectively and an information processing apparatus for requesting an input/output of data so as to receive an input/output request from the information processing apparatus and execute an input/output processing of the data for each of the plurality of storage volumes. The method brings one (primary) of the plurality of storage volumes into correspondence with another (secondary) in which a copy of data is to be written when the data is written in the primary volume so as to form a pair group consisting of a plurality of pairs, each having such a primary volume and such a secondary volume.

50 Claims, 7 Drawing Sheets

U.S. PATENT DOCUMENTS

| | | |
|---|---|---|
| 6,199,074 B1 | 3/2001 | Kern et al. |
| 6,301,643 B1 | 10/2001 | Crockett et al. |
| 6,308,284 B1 | 10/2001 | LeCrone et al. |
| 6,370,626 B1 | 4/2002 | Gagne et al. |
| 6,539,462 B1 | 3/2003 | Mikkelsen et al. |
| 6,581,143 B2 | 6/2003 | Gagne et al. |
| 6,647,474 B2 | 11/2003 | Yanai et al. |
| 6,651,075 B1 | 11/2003 | Kusters et al. |
| 6,697,881 B2 | 2/2004 | Cochrane |
| 6,708,227 B1 | 3/2004 | Cabrera et al. |
| 6,708,285 B2 | 3/2004 | Oldfield et al. |
| 6,721,851 B2 | 4/2004 | Ohr |
| 6,754,682 B1 | 6/2004 | LeCrone et al. |
| 6,789,178 B2 | 9/2004 | Mikkelsen et al. |
| 6,799,258 B1 | 9/2004 | Linde |
| 6,826,666 B2 | 11/2004 | Berkowitz et al. |
| 2002/0095489 A1 | 7/2002 | Yamagami |
| 2002/0129203 A1 | 9/2002 | Gagne et al. |
| 2003/0014432 A1 | 1/2003 | Teloh et al. |
| 2003/0163655 A1 | 8/2003 | McKean et al. |
| 2003/0172149 A1 | 9/2003 | Edsall et al. |
| 2004/0103261 A1 | 5/2004 | Honda et al. |
| 2004/0250021 A1 | 12/2004 | Honda et al. |
| 2005/0071588 A1 | 3/2005 | Spear et al. |

FOREIGN PATENT DOCUMENTS

| | | |
|---|---|---|
| EP | 1217523 | 6/2002 |
| JP | 8-305500 | 11/1996 |
| JP | 08-305500 | 11/1996 |
| JP | 11-327803 | 11/1999 |
| JP | 2001-318833 | 11/2001 |

OTHER PUBLICATIONS

Burkes et al, "Design Approaches for Real-Time Transaction Processing Site Recovery", Proceedings of the IEEE Spring CompCon Conference, 1990, pp. 568-572.

Microsoft Computer Dictionary, 2002, Microsoft Press, 5$^{th}$ Ed., p. 216.

SHARED STORAGE 230

CONSISTENCY GROUP MANAGEMENT TABLE 231

| CONSISTENCY GROUP NO. | BATCH SPLIT RECEIVING FLAG |
|---|---|
| 0 | ON |
| 1 | OFF |
| 2 | OFF |
| 3 | OFF |
| ⋮ | ⋮ |

PAIR MANAGEMENT TABLE 232

| PAIR | MAIN VOLUME | SUB VOLUME | PAIR STATE | CONSISTENCY GROUP |
|---|---|---|---|---|
| A | 1 | 2 | SPLIT | 0 |
| B | 3 | 4 | PAIRED | 0 |
| C | 5 | 6 | SPLIT | 1 |
| D | 7 | 8 | SPLIT | 1 |
| ⋮ | ⋮ | ⋮ | ⋮ | ⋮ |

FIG.8

SHARED STORAGE 230

CONSISTENCY GROUP MANAGEMENT TABLE 231

| CONSISTENCY GROUP NO. | SPLIT STARTING TIME |
|---|---|
| 0 | 12:00 |
| 1 | - |
| 2 | - |
| 3 | - |
| ⋮ | ⋮ |

PAIR MANAGEMENT TABLE 232

| PAIR | MAIN VOLUME | SUB VOLUME | PAIR STATE | CONSISTENCY GROUP |
|---|---|---|---|---|
| A | 1 | 2 | SPLIT | 0 |
| B | 3 | 4 | PAIRED | 0 |
| C | 5 | 6 | SPLIT | 1 |
| D | 7 | 8 | SPLIT | 1 |
| ⋮ | ⋮ | ⋮ | ⋮ | ⋮ |

METHOD FOR CONTROLLING STORAGE DEVICE CONTROLLER, STORAGE DEVICE CONTROLLER, AND PROGRAM

CROSS-REFERENCE TO RELATED APPLICATIONS

This is a continuation application of U.S. Ser. No. 11/389,056, filed Mar. 27, 2006 (now U.S. Pat. No. 7,334,097), which is a continuation application of U.S. Ser. No. 10/684,210, filed Oct. 10, 2003 (now U.S. Pat. No. 7,093,087) and is related to U.S. Ser. No. 11/180,378, filed Jul. 12 2005 (now U.S. Pat. No. 7,089,386). The present application claims priority upon Japanese Patent Application No. 2002-366374 filed on Dec. 18, 2002, which is herein incorporated by reference.

BACKGROUND OF THE INVENTION

1. Field of the Invention

The present invention relates to a method for controlling a storage device controller, a storage device controller, and a program.

2. Description of the Related Arts

There is a well-known copy management function used in a storage system that includes an information processing apparatus and a disk array unit connected to each other for communications. The function manages primary volume data in duplicate by copying data from a primary volume to a secondary volume in real time. The primary (master) volume that is a source of copy and the secondary (sub) volume that is a destination of copy are paired.

In such a storage system, however, data often overflows one primary volume into other primary volumes during communications between the information processing apparatus and the disk array unit. If an attempt is made to back up the data in such an occasion, a plurality of pairs (of primary and secondary volumes) must be reset from the paired state. If data in a primary volume for which the pair is already reset is updated during sequential resetting of paired states, the data is not updated in its corresponding secondary volume while data in a primary volume of which pair state is not reset is updated in its corresponding secondary volume sometimes.

SUMMARY OF THE INVENTION

Under such circumstances, it is an object of the present invention to provide a method for controlling a storage device controller, a storage device controller, and a program capable of managing copies of data while keeping the consistency among the data stored in a plurality of storage volumes.

One aspect of the present invention resides in the storage device controlling method that controls the storage device controller connected to a storage device provided with a plurality of storage volumes for storing data and an information processing apparatus for requesting the input/output of the data and used to input/output the data to/from the storage volumes. The method comprises a step of bringing one (source) of the storage volumes into correspondence with another (destination) in which a copy of data is to be written when the data is written in the source storage volume so as to form a pair group consisting of a plurality of such source and destination storage volumes; a step of resetting the correspondence between source and destination storage volumes of each pair in the pair group; a step of deciding whether or not it is after the correspondence is reset that an input/output request has been issued from the information processing apparatus; and a step of inputting/outputting data after the correspondence is reset when it is after the correspondence is reset that the input/output request has been issued from the information processing apparatus.

The storage device and the storage device controller are included in the disk array unit. The information processing apparatus and the disk array unit are included in the storage system.

Storage volumes are storage resources provided in the disk array unit or storage device and they are divided into physical volumes and logical volumes. A physical volume is a physical storage area provided in a disk drive of the disk array unit or storage device and a logical volume is a storage area allocated logically in a physical volume.

The "paired" means a state in which two storage volumes are brought into correspondence with each other as described above.

That is why the present invention can provide a method for controlling a storage device controller, a storage device controller, and a program capable of managing copies of data while keeping the consistency among data stored in a plurality of storage volumes as described above.

BRIEF DESCRIPTION OF THE DRAWINGS

Preferred embodiments of the present invention will now be described in conjunction with the accompanying drawings, in which:

FIG. 8 is a table stored in the shared storage provided in the storage device controller in the embodiment of the present invention.

DETAILED DESCRIPTION OF THE INVENTION

Hereunder, the preferred embodiments of the present invention will be described in detail with reference to the accompanying drawings.

===Overall Configuration===

Figure 1:
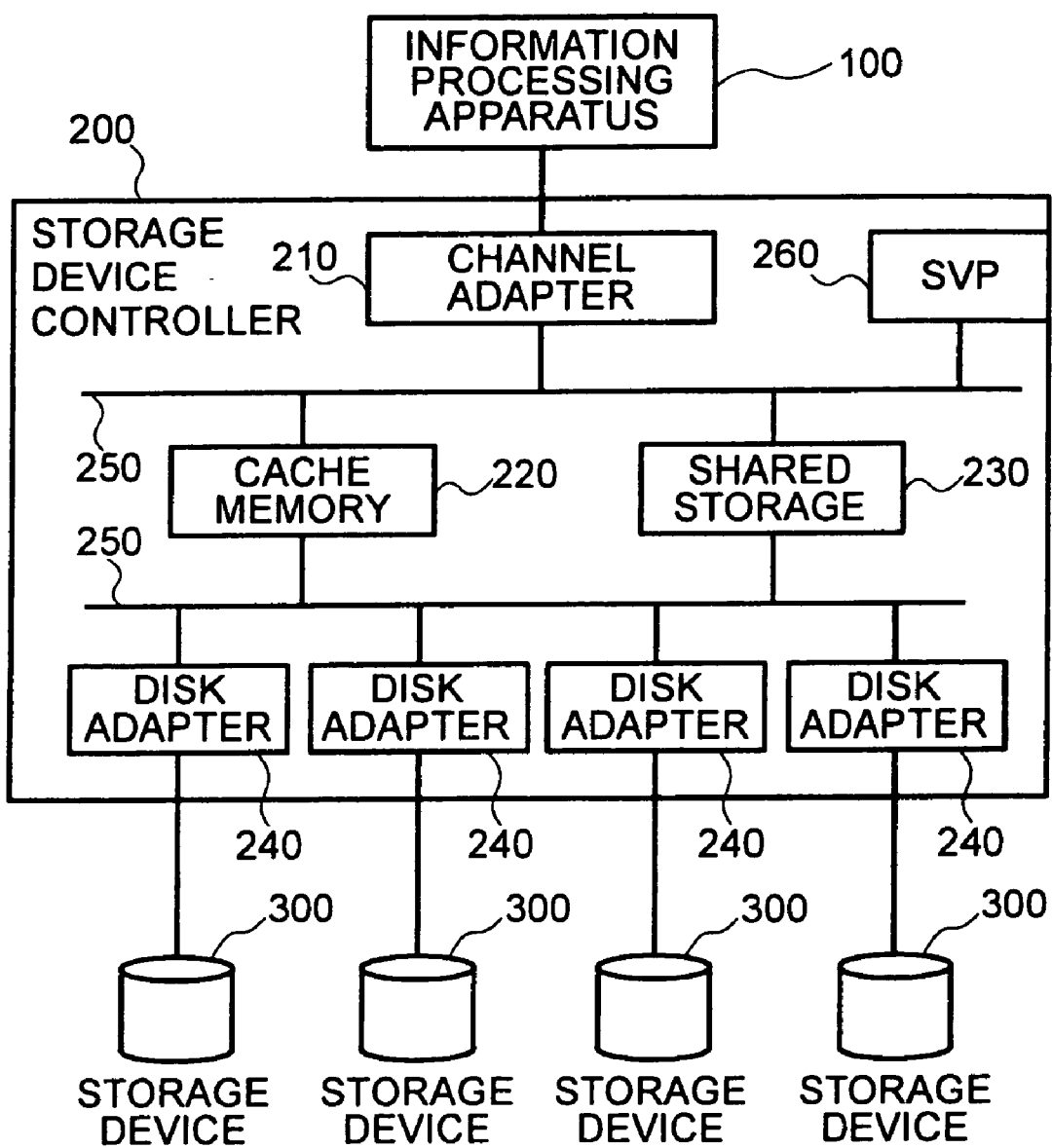
FIG. 1 is an overall block diagram of a storage system in an embodiment of the present invention.

At first, the storage system in an embodiment of the present invention will be described with reference to the block diagram shown in FIG. 1.

An information processing apparatus 100 is a computer provided with a CPU (Central Processing Unit), a memory, etc. The CPU of the information processing apparatus 100 executes various types of programs to realize various functions of the apparatus 100. The information processing apparatus 100 is used, for example, as a core computer in an automatic teller machine in a bank, a flight ticket reservation system, or the like.

The information processing apparatus 100 is connected to a storage device controller 200 to communicate with the controller 200. The information processing apparatus 100 issues data input/output commands (requests) to the storage device controller 200 to read/write data from/to the storage devices 300. The information processing apparatus 100 also sends/receives various commands to/from the storage device controller 200 to manage the storage devices 300. For example, the commands are used for managing copies of data stored in the storage volumes provided in the storage devices 300.

Figure 2:
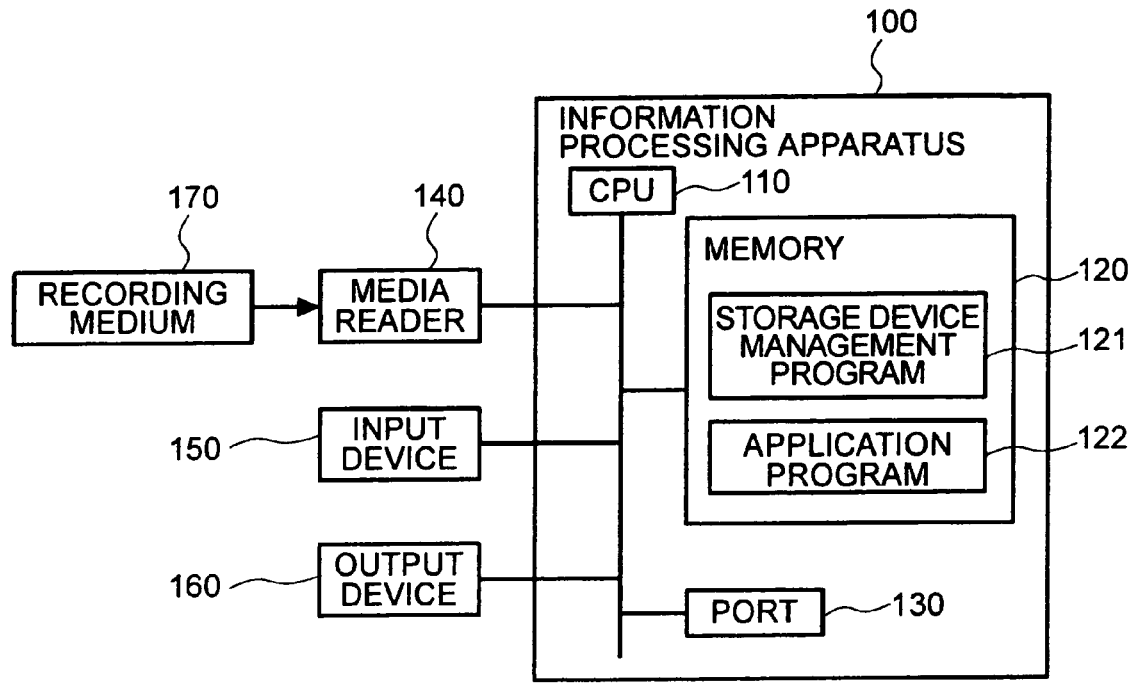
FIG. 2 is a block diagram of an information processing apparatus in the embodiment of the present invention.

FIG. 2 shows a block diagram of the information processing apparatus 100.

The information processing apparatus 100 is configured by a CPU 110, a memory 120, a port 130, a media reader 140, an input device 150, and an output device 160.

The CPU 110 controls the whole information processing apparatus 100 and executes the programs stored in the memory 120 to realize various functions of the apparatus 100. The media reader 140 reads programs and data recorded on the recording medium 170. The memory 120 stores the programs and data read by the reader 140. Consequently, the media reader 170 can be used to read a storage device management program 121 and an application program 122 recorded in the medium 170 and store them in the memory 120. The recording medium 170 may be any of flexible disks, CD-ROM disks, semiconductor memories, etc. The media reader 140 may also be built in the information processing apparatus 100 or provided as an external device. The input device 150 is used by the operator to input data addressed to the information processing apparatus 100. The input device 150 may be any of keyboards, mice, etc. The output device 160 outputs information to external. The output device 160 may be any of displays, printers, etc. The port 130 is used to communicate with the storage device controller 200. In that connection, the storage device management program 121 and the application program 122 may be received from another information processing apparatus 100 through the port 130 and stored in the memory 120.

The storage device management program 121 manages copies of data stored in the storage volumes provided in the storage devices 300. The storage device controller 200 manages copies of data with use of various copy management commands received from the information processing apparatus 100.

The application program 122 realizes the functions of the information processing apparatus 100. For example, the program 122 realizes functions of an automatic teller machine of a bank and functions of a flight ticket reservation system as described above.

Next, the storage device controller 200 will be described with reference to FIG. 1 again. The storage device controller 200 controls the storage devices 300 according to the commands received from the information processing apparatus 100. For example, when receiving a data input/output request from the information processing apparatus 100, the storage device controller 200 inputs/outputs data to/from a storage volume provided in a storage device 300.

The storage device controller 200 is configured by a channel adapter 210, a cache memory 220, a shared storage 230, a disk adapter 240, a management terminal (SVP: SerVice Processor) 260, and a connection unit 250.

The channel adapter 210 provided with a communication interface with the information processing apparatus 100 exchanges data input/output commands, etc. with the information processing apparatus 100.

Figure 3:
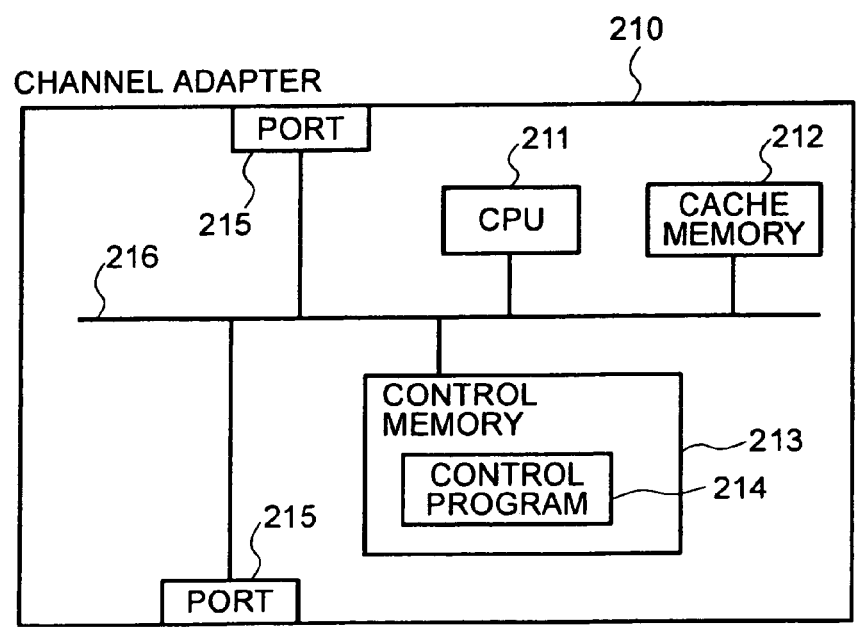
FIG. 3 is a block diagram of a channel adapter provided in a storage device controller in the embodiment of the present invention.

FIG. 3 shows a block diagram of the channel adapter 210.

The channel adapter 210 is configured by a CPU 211, a cache memory 212, a control memory 213, a port 215, and a bus 216.

The CPU 211 controls the whole channel adapter 210 by executing a control program 214 stored in the control memory 213. The control program 214 stored in the control memory 213 thus enables data copies to be managed in this embodiment. The cache memory 212 stores data, commands, etc. to be exchanged with the information processing apparatus 100 temporarily. The port 215 is a communication interface used for the communication with the information processing apparatus 100 and other devices provided in the storage device controller 200. The bus 216 enables the mutual connection among those devices.

Return to FIG. 1 again. The cache memory 220 stores data to be exchanged between the channel adapter 210 and the disk adapter 240 temporarily. In other words, if the channel adapter 210 receives a write command as a data input/output command from the information processing apparatus 100, the channel adapter 210 writes the command in the shared storage 230 and the target data received from the information processing apparatus 100 in the cache memory 220 respectively. The disk adapter 240 then reads the target data from the cache memory 220 according to the write command written in the shared storage and writes the read data in a storage device 300.

The management terminal 260 is a kind of information processing apparatus used for the maintenance/management of the storage device controller 200 and the storage devices 300. For example, the management terminal 260 changes the control program 214 executed in the channel adapter 210 to another. The management terminal 260 may be built in the storage device controller 200 or may be separated. The management terminal 260 may also be dedicated to the maintenance/management of the storage device controller 200 and the storage devices 300 or may be configured as a general information processing apparatus for maintenance/management. The configuration of the management terminal 260 is the same as that of the information processing apparatus 100 shown in FIG. 2. Concretely, the management terminal 260 is configured by a CPU 110, a memory 120, a port 130, a recording media reader 140, an input device 150, and an output device 160. Consequently, the control program to be executed in the channel adapter 210 may be read from the recording medium 170 through the media reader 140 of the management terminal 260 or received from the information processing apparatus 100 connected thereto through the port 130 of the management terminal 260.

The disk adapter 240 controls the storage devices 300 according to the commands received from the channel adapter 210.

Each of the storage devices 300 is provided with a storage volume to be used by the information processing apparatus 100. Storage volumes are storage resources provided in the storage devices 300 and divided into physical volumes that are physical storage areas provided in disk drives of the storage devices 300 and logical volumes that are storage areas allocated logically in those physical volumes. The disk drives may be any of, for example, hard disk drives, flexible disk drives, semiconductor storage devices, etc. The disk adapter 240 and each of the storage devices 300 may be connected to each other directly as shown in FIG. 1 or through a network.

The storage devices 300 may also be united with the storage device controller 200 into one.

Figures 4, 5:
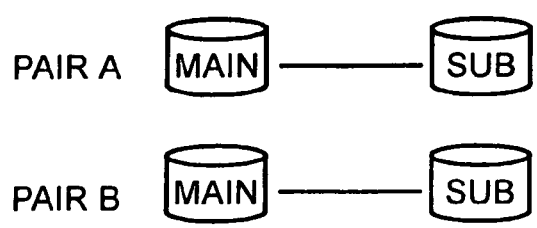
FIG. 4 is a table stored in a shared storage provided in the storage device controller in the embodiment of the present invention.
FIG. 5 is pairs of storage volumes in the embodiment of the present invention.

The shared storage 230 can be accessed from both of the channel adapter 210 and the disk adapter 240. The shared storage is used to receive/send data input/output requests/ commands and store management information, etc. of the storage device controller 200 and the storage devices 300. In this embodiment, the shared storage 230 stores a consistency group management table 231 and a pair management table 232 as shown in FIG. 4.

===Pair Management Table===

The pair management table 232 is used to manage copies of data stored in the storage devices 300. The table 232 has columns of "pair", "primary volume", "sub volume", "pair state", and "consistency group".

The "pair" column holds pair names. A pair means a combination of two storage volumes. FIG. 5 shows an example of paired storage volumes. In FIG. 5, two pairs, that is, pairs A and B are denoted. One of paired volumes and the other of the paired volumes are managed as a primary volume and a secondary volume. In FIG. 5, a primary volume is described as a master volume and a secondary volume is described as a sub volume. A plurality of secondary volumes can be combined with one primary volume.

Return to the pair management table 232 shown in FIG. 4. The "primary" column describes primary volumes paired with secondary volumes while the "secondary" column describes secondary volumes paired with primary volumes.

The "pair state" column describes the state of each pair of volumes. The "pair state" is classified into "paired", "split", and "re-sync".

The "paired" denotes that data in a secondary volume is updated with the data in its corresponding primary volume written by the information processing apparatus 100. The consistency of the data stored in a pair of primary and secondary volumes is assured with such correspondence set between those primary and secondary volumes.

The "split" denotes that data in a secondary volume is not updated with the data in its corresponding primary volume written by the information processing apparatus 100. Concretely, while primary and secondary volumes are in such a "split" state, the correspondence between those volumes is reset. Consequently, the data consistency is not assured between those primary and secondary volumes. However, because data in any secondary volume that is in the "split" state is not updated, the data in secondary volumes can be backed up during the while; for example, data stored in secondary volumes can be saved in a magnetic tape or the like. This makes it possible to back up data while the data in primary volumes is used continuously during the backup operation for a job that has been executed by the information processing apparatus 100.

The "re-sync" denotes a transition state of a pair of volumes, for example, from "split" to "paired". More concretely, the "re-sync" means a state in which data in a secondary volume is being updated with the data written in its corresponding primary volume while the pair is in the "split" state. When the data in the secondary volume is updated, the state of the pair is changed to "paired".

To form a pair of storage volumes or to change the state of the pair from "paired"/"split" to "split"/"paired", the operator instructs the information processing apparatus 100 in which the storage device management program 121 is executed through the input device 150. A command from the operator is then sent to the channel adapter 210 of the storage device controller 200. After that, the channel adapter 210 executes the control program 214 to form a pair of storage volumes or change the state of the pair according to the command. According to the state of the formed pair of storage volumes, the channel adapter 210 controls the object storage volumes, for example, updating a secondary volume with a copy of data updated in its corresponding primary volume when those volumes are "paired".

As described above, the channel adapter 210 changes the states of pairs one by one sequentially. This is because one primary volume can be paired with a plurality of secondary volumes as described above and if the states of a plurality of pairs are changed simultaneously, the management of primary volumes comes to become complicated.

Forming a pair of volumes and changing the state of each pair of volumes can also be made automatically at a predetermined time or according to a command received from another information processing apparatus 100 connected through the port 130 independently of instructions from the operator.

===Consistency Group===

The "consistency group" column describes the number of each consistency group (pair group) consisting of pairs of volumes. A consistency group means a group of a plurality of storage volume pairs to be controlled so that the states of those pairs are changed to the "split" together. Concretely, a plurality of pairs in a consistency group are controlled so that their states are changed to the "split" simultaneously (hereinafter, this processing will be referred to as the synchronism among the state changes to the "split") while the states of a plurality of paired volumes are changed one by one sequentially as described above.

For example, assume now that the information processing apparatus 100 writes data in a storage volume while the pair states of a plurality of paired volumes in a consistency group are changed sequentially from "paired" to "split". If no consistency group is formed and the data is written in a paired primary volume after the pair state is changed to the "split", the data is not written in its corresponding secondary volume. If the data is written in a paired primary volume of which state is not changed to the "split" yet, the data is also written in the secondary volume. If the paired primary volume belongs to a consistency group at that time, however, the data is not written in its corresponding secondary volume regardless of the pair state of the primary volume (whether it is in the "split" or not). This is because the data is written in the primary volume after pair splitting (resetting of the correspondence between primary and secondary volumes) is started in the consistency group.

Forming a consistency group with a plurality of pairs such way is effective for a case in which data is to be stored in a plurality of storage volumes, for example, when write data is too large to be stored in one storage volume and when it is controlled so that one file data is stored in a plurality of storage volumes.

Such assured synchronism of the pair state changes of volumes to the "split" in a consistency group is also effective for writing/reading of data in/from secondary volumes requested from the information processing apparatus 100.

Concretely, if no consistency group is already formed, data can be written/read in/from any paired secondary volume after the pair state is changed to the "split" while it is inhibited to write/read data in/from any secondary volume of which pair state is not changed to the "split".

In this embodiment, a batch split receiving flag (ID information) of the consistency group management table 231 is used to assure the synchronism of such pair state changes of volumes to the "split" in the above consistency group. Next, the processings for assuring such synchronism will be described with reference to the flowchart shown in FIG. 6.

===Processing Flow===

The following processings are executed by the CPU 211 provided in the channel adapter 210 with use of the control program 214 (program) consisting of codes for realizing various operations in this embodiment.

At first, the channel adapter 210 receives a pair splitting request (split command) addressed to a consistency group from the information processing apparatus 100(S1000). The channel adapter 210 then turns on the batch split receiving flag in the consistency group management table 231 stored in the shared storage 230 (S1001). After that, the channel adapter 210 begins to change the pair state of a not-split pair of volumes in the consistency group to the "split" (S1003). Concretely, the channel adapter 210 resets the correspondence between the primary volume and the secondary volume in the pair and stops updating of the data in the secondary volume with the data written in the primary volume. The channel adapter 210 then changes the description for the pair in the "paired" column in the pair management table 232 to "split" (S1004). Those processings are repeated for each pair in the consistency group. When the states of all the pairs in the consistency group are changed to the "split" (S1005), the channel adapter 210 turns off the batch split flag, then exits the processing.

If the channel adapter 210 receives a read/write request from the information processing apparatus 100 during the above processing, the adapter 210 checks whether or not the request is addressed to a not-split storage volume, that is, a "paired" storage volume (for which the correspondence to its secondary volume is not reset)(S1006). If the check result is YES (addressed), the adapter 210 changes the pair state of the volume to the "split" (S1007). The adapter 210 then changes the description of the pair in the pair state column in the pair management table 232 to the "split" (S1008) and executes the data read/write processing (input/output processing)(S1009).

On the other hand, if the check result in (S1006) is NO (not addressed), this means that the command is addressed to a "split" volume. The adapter 210 thus executes the read/write processing for the storage volume (S1009) immediately.

Consequently, the synchronism of the pair state changes of "paired" volumes to the "split" in a consistency group is assured.

Figure 6:
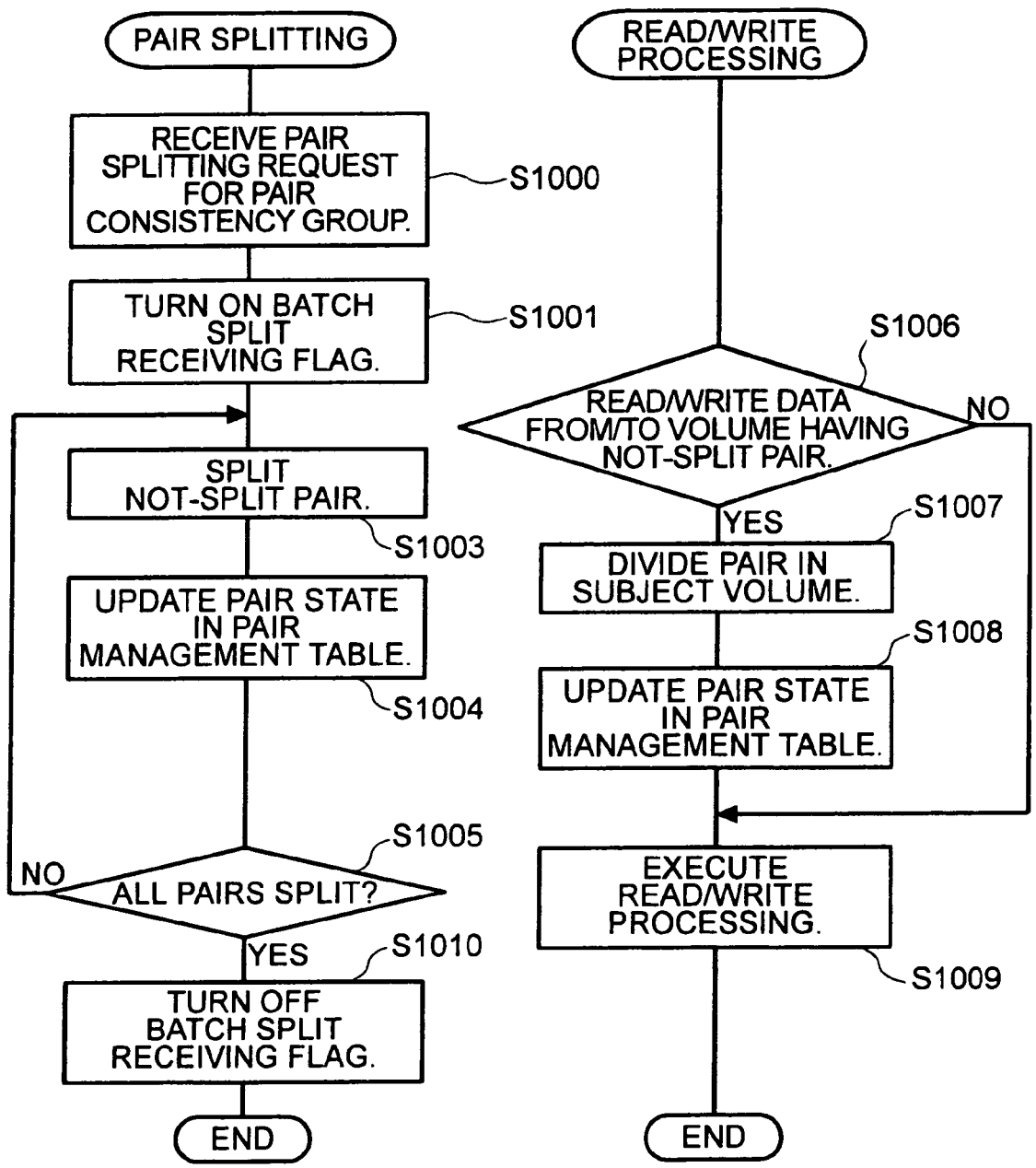
FIG. 6 is a flowchart of the processings of the storage device controller for splitting a pair in the embodiment of the present invention.

In the flowchart shown in FIG. 6, if the channel adapter 210 receives a read/write request from the information processing apparatus 100 while splitting paired volumes in a consistency group sequentially, the adapter 210 checks whether or not the request is addressed to a not-split pair of volumes (S1006) to execute the read/write processing (S1009). However, it is also possible for the adapter 210 to suppress the execution of the read/write processing requested from the information processing apparatus 100 while the adapter 210 splits paired volumes in a consistency sequentially. In that connection, the adapter 210 can execute the read/write processing after the adapter 210 completes splitting of all the paired volumes in the consistency group and turns off the batch split flag.

Figure 7:
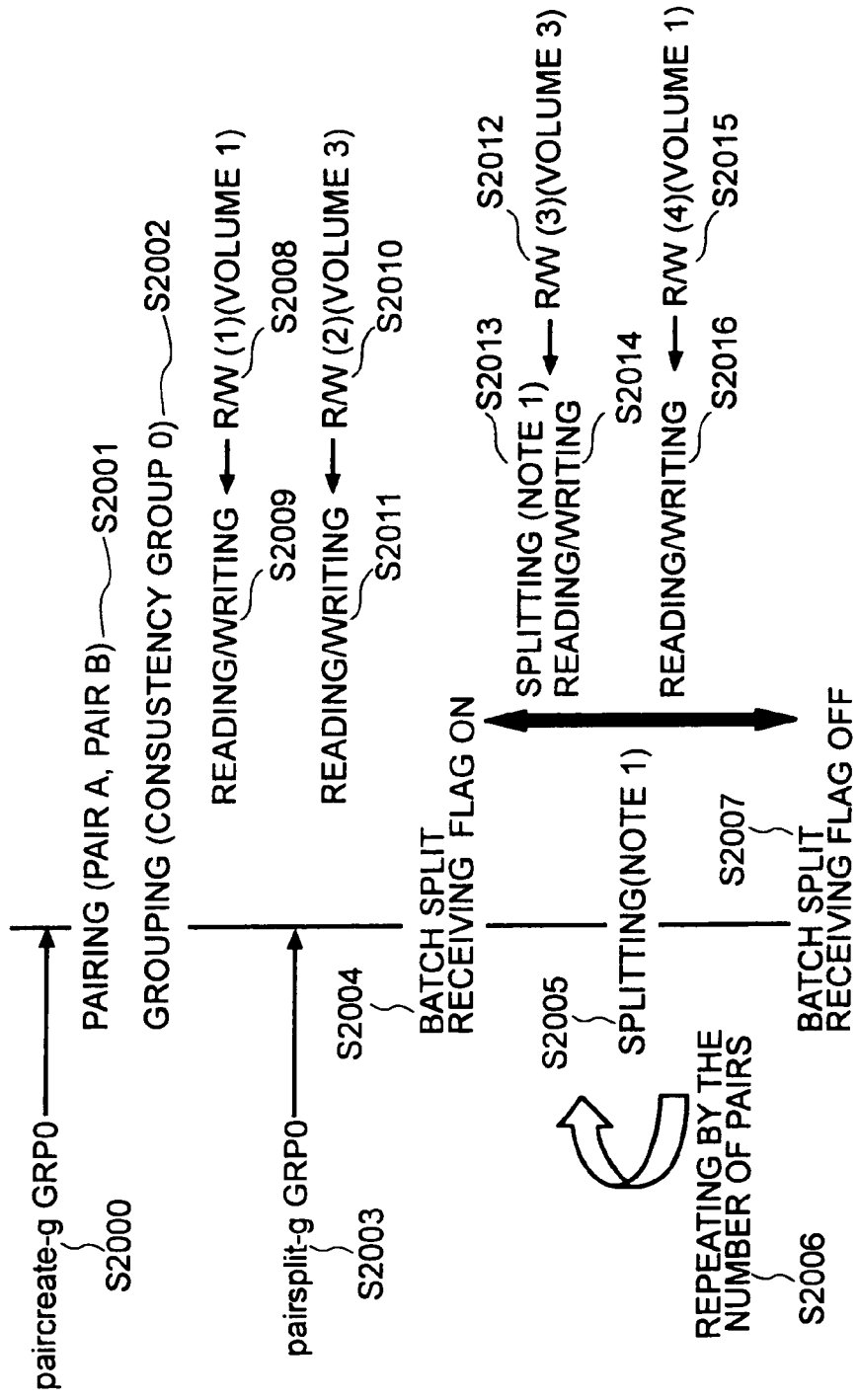
FIG. 7 is a flowchart of the processings of the storage device controller for splitting a pair and inputting/outputting the split pair data items in the embodiment of the present invention.

FIG. 7 shows a flowchart for those processings by the channel adapter 210 in detail.

At first, the channel adapter 210 forms a consistency group for both pairs A and B according to a command received from the information processing apparatus 100(S2000 to S2002). The command is inputted, for example, by the operator through the input device 150 of the information processing apparatus 100. The command inputted to the information processing apparatus 100 is sent to the channel adapter 210 by the storage device management program 121. The "paircreate -g GRP0" shown in FIG. 7 is such a command. Receiving the command, the channel adapter 210 forms a consistency group, then records predetermined data in the pair management table 232 and the consistency group management table 231 stored in the shared storage 230 respectively. FIG. 4 shows how the predetermined data is recorded in those tables 231 and 232. However, although the state of the pair A is described as "split" in the pair state column in the pair management table 232 shown in FIG. 4, the state of the pair A at that time is actually "paired". Similarly, although "ON" is described in the batch split receiving flag column for the consistency group 0 in the consistency group management table 231, the actual state at that time is actually "OFF".

The channel adapter 210, when receiving a read/write request (R/W1) for the storage volume 1 in the pair A from the information processing apparatus 100(S2008), executes the read/write processing as usually (S2009). This is because "OFF" is described in the batch split receiving flag column for the consistency group 0 in the consistency group management table 231.

After that, the information processing apparatus 100 instructs the channel adapter 210 to split the pair B in the consistency group 0 with a command (S2003). The "pairsplit -g GRP0" shown in FIG. 7 is an example of the command issued at that time. This command may also be inputted by the operator through the input device 150 of the information processing apparatus 100.

The channel adapter 210 then turns on the batch split receiving flag for the consistency group 0 in the consistency group management table 231 stored in the shared storage 230 (S2004) to start splitting of each pair sequentially. (S2005, S2006). FIG. 4 shows the pair management table 232 in which the pair A is split. Completing splitting of all the target pairs, the channel adapter 210 turns OFF the batch split receiving flag and exits the processing (S2007).

If the channel adapter 210 receives a read/write request (R/W2) addressed to the storage volume 3 of the pair B from the information processing apparatus 100 (S2010) while the channel adapter 210 turns ON the batch split receiving flag (S2004) after receiving a split command addressed to the consistency group 0 from the information processing apparatus 100, the channel adapter 210 executes the read/write processing as usually (S2011). This is because "OFF" is still set in the batch split receiving column for the consistency group 0 in the consistency group management table 231.

However, if the channel adapter 210 receives a read/write request (R/W3) addressed to the storage volume 3 of the pair B from the information processing apparatus 100 (S2012) after turning ON the batch split receiving flag (S2004), the channel adapter 210 splits the pair B (S2013), then executes the read/write processing (S2014).

As described above, the channel adapter 210, when receiving a read/write request from the information processing apparatus 100, refers to the batch split receiving flag to check whether or not it is after resetting of the pair state of each pair in the consistency group is started that the read/write command has been issued.

If the channel adapter 210 receives the read/write request (R/W4) after completing splitting of the pair A in (S2005), the channel adapter 210 executes the read/write processing (S2016). This is because "split" is set for the pair A in the pairing column in the pair management table 232 and the channel adapter 210 knows that "splits" denotes that the pair A is split.

In that connection, no splitting processing is done for the pair B in (S2005), since the pair B is already split during the read/write processing in (S2013).

In this embodiment, because the batch split receiving flag is provided as described above, the synchronism among the pair state changes of all the pairs in a consistency group to the "split" is assured.

===Consistency Group Management Table===

Next, a description will be made for another embodiment of the present invention with respect to the management information in the consistency group management table 231.

In this embodiment, each split starting time is recorded in the consistency group management table 231 as shown in FIG. 8. In the example shown in FIG. 8, splitting of pairs in the consistency group 0 is started at 12:00. When splitting of all the pairs in the consistency group 0 is completed, the description in the split starting time column is changed to "−".

A split starting time is specified with a command received from the information processing apparatus 100. Such split starting may also be specified so as to be started immediately with a command; no concrete time is specified in such an occasion. In that connection, the current time is recorded in the split starting time column.

In this embodiment, the channel adapter 210, when receiving a read/write command from the information processing apparatus 100, compares the read/write command issued time recorded in the read/write command (request) with the time described in the split starting time column of the consistency group management table 231. If the command issued time is later, the channel adapter 210 executes the read/write processing after the end of the splitting.

This is why it is possible to assure the synchronism among the state changes of pairs in a consistency group to the "split".

===Processing Flow===

Next, how the above processings are executed will be described in detail with reference to the flowchart shown in FIG. 9.

The processings are executed by the CPU 211 of the channel adapter 210 with use of the control program 214 consisting of codes for realizing various operations in this embodiment.

At first, the channel adapter 210 receives a pair splitting request (split command) addressed to a consistency group from the information processing apparatus 100 (S3000). The channel adapter 210 then records the split starting time recorded in the split command in the split starting time column of the consistency group management table 231 stored in the shared storage 230 (S3001). After that, the channel adapter 210 compares the split starting time with the current time to check whether or not the split starting time is passed (S3003). If the check result is YES (passed), the channel adapter 210 begins the state change of a not-split pair in the consistency group to the "split" (S3004). Concretely, the channel adapter 210 resets the correspondence between primary and secondary volumes of the pair and suppresses updating of the data in the secondary volume with the data written in the primary volume. The channel adapter 210 then changes the description for the pair in the pair state column in the pair management table 232 to "split" (S3005). The above processings are repeated for all of the pairs in the consistency group. When the states of all the pairs in the consistency group are changed to "split" (S3006), the channel adapter 210 changes the description for the pair in the split starting time column to "−" and exits the processing (S3007).

If the channel adapter 210 receives a read/write request from the information processing apparatus 100 during the above processing, the channel adapter 210 checks whether or not the request is addressed to a not-split pair, that is, a "paired" storage volume (the correspondence is not reset) (S3008). If the check result is YES (addressed), the channel adapter 210 compares the command issued time recorded in the command with the split starting time (S3010). If the command issued time is later, the channel adapter 210 changes the pair state to the "split" (S3011), then changes the description for the pair in the pair state column in the pair management table 232 to "split" (S3012). After that, the channel adapter 210 executes the read/write processing (input/output processing) (S3013).

On the other hand, if the read/write command is addressed to a split pair in (S3008), that is, a "split" storage volume or the command issued time recorded in the request is earlier than the split starting time, the channel adapter 210 reads/writes data from/in the storage volume (S3009).

This is why it is possible to assure the synchronism among the state changes of the pairs in a consistency group to the "split".

Figure 9:
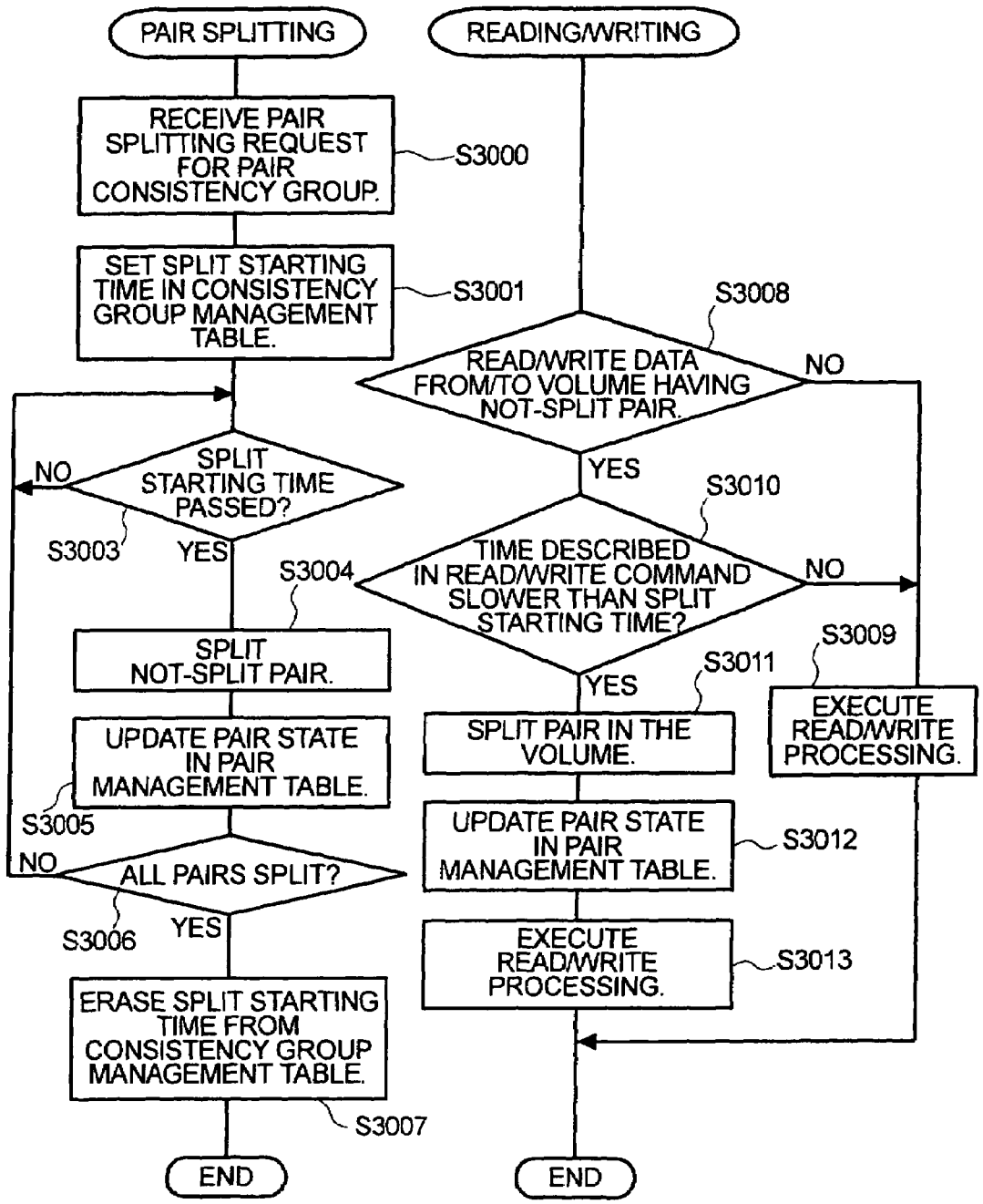
FIG. 9 is a flowchart of the processings of the storage device controller for splitting a pair.

In the flowchart shown in FIG. 9, if the channel adapter 210 receives a read/write request from the information processing apparatus 100 while splitting pairs in a consistency group sequentially, the channel adapter 210 checks whether or not the request is addressed to a not-split storage volume (S3008) and executes the read/write processing (S3009, S3013). However, the channel adapter 210 can also suppress execution of the read/write processing even when receiving a read/write request from the information processing apparatus 100 while splitting pairs in a consistency group sequentially as described above. In that occasion, the channel adapter 210 executes the read/write processing after completing splitting of all the pairs in the consistency group and changing the description for the pair in the split starting time column to "−".

In this embodiment, consistency groups are formed by storage devices 300 connected to the same storage device controller respectively. However, the present invention is not limited only to that embodiment. In this embodiment, consistency groups should preferably be formed by storage devices 300 connected to a plurality of storage device controllers 300 respectively. In that connection, a consistency group may be formed over a plurality of storage device controllers 200 that come to communicate with each another to create the consistency group management table 231 and the pair management table 232. The consistency group management table 231 and the pair management table 232 may be managed by one of the storage device controllers 200 and shared with other storage device controllers 200 or each of those storage device controllers manages the same table. Furthermore, volumes controlled by a plurality of storage device controllers 200 should preferably be paired in this embodiment. In that connection, a pair might be formed over a plurality of storage device controllers 200 and those storage device controllers 200 come to communicate with each another to create the consistency group management table 231 and the pair management table 232. In that connection, the consistency group management table 231 and the pair management table 232 may be managed by one of the storage device controllers 200 and shared with other storage device controllers 200 or those storage device controllers manages the same table respectively.

While the embodiments of the present invention have been described, the description is just for illustrative purposes, and it is to be understood that changes and variations may be made without departing from the spirit or scope of the following claims.

What is claimed is:

1. A system including a plurality of storage controllers and a plurality of storage devices comprising:
    a first storage controller of the storage controllers operatively coupled to an information processing apparatus and configuring a plurality of first volumes; and
    a second storage controller of the storage controllers configuring a plurality of second volumes;
    wherein the first and second storage controllers form a consistency group with the first volumes and the second volumes,
    wherein the first storage controller starts to split a plurality of pairs of paired volumes in the consistency group upon receiving a group split command, created by the information processing apparatus, for the consistency group, and
    wherein the first storage controller suppresses an execution of a write request, addressed to a volume in the consistency group and received from the information processing apparatus after receiving the group split command, until a completion of splitting the pairs of the paired volumes in the consistency group.

2. A system according to claim 1, wherein the first storage controller executes a write request, that is not addressed to a volume in the consistency group, during splitting the pairs of the paired volumes in the consistency group.

3. A system according to claim 1, wherein the first storage controller executes the suppressed write request addressed to the volume in the consistency group after the completion of splitting the pairs of the paired volumes in the consistency group.

4. A system according to claim 1, wherein the first volumes are primary volumes to be addressed from the information processing apparatus, and the second volumes are secondary volumes to be updated with a copy data of a write data to be written to the primary volumes.

5. A system according to claim 1, wherein the first storage controller sequentially splits the pairs of the paired volumes in the consistency group.

6. A system according to claim 1, wherein the pairs of the paired volumes in the consistency group are split in a state in which synchronism is assured.

7. A system according to claim 1, wherein two or more volumes in the set of paired volumes become point-in-time copy volumes based on the completion of splitting the pairs of the paired volumes in the consistency group.

8. A system including a plurality of storage controllers and a plurality of storage devices comprising:
    a first storage controller operatively coupled to an information processing apparatus and coupled to a plurality of first storage devices provided with a plurality of first volumes; and
    a second storage controller coupled to a plurality of second storage devices provided with a plurality of second volumes;
    wherein the first and second storage controllers form a consistency group with the first volumes and the second volumes,
    wherein the first storage controller starts to split a plurality of pairs in the consistency group upon receiving a group split command being created for the consistency group,
    wherein the first storage controller suppresses an execution of a write request, addressed to a volume in the consistency group and received from the information processing apparatus, after receiving the group split command for splitting the pairs in the consistency group, and
    wherein the first storage controller executes a write request addressed to a volume, which is not in the consistency group, during splitting the pairs in the consistency group.

9. A system according to claim 8, wherein the first storage controller executes the suppressed write request addressed to the volume in the consistency group after the completion of splitting the pairs in the consistency group.

10. A system according to claim 8, wherein the first volumes are primary volumes to be addressed from the information processing apparatus, and the second volumes are secondary volumes to be updated with a copy data of a write data to be written to the primary volumes.

11. A system according to claim 8, wherein the first storage controller sequentially splits the pairs in the consistency group.

12. A system according to claim 8, wherein the pairs in the consistency group are split in a state in which synchronism is assured.

13. A system according to claim 8, wherein the second volumes become point-in-time copy volumes based on the splitting of the pairs in the consistency group.

14. A storage control method comprising the steps of:
    creating a plurality of pairs of volumes using a plurality of volumes;
    forming, by a plurality of storage controllers, a consistency group by selecting at least two pairs based upon a group create command;
    splitting, by at least one of the storage controllers, the at least two pairs in the consistency group after receiving a group split command for the consistency group; and
    suppressing, by at least one of the storage controllers, an execution of a write request until completion of splitting the at least two pairs in the consistency group, the write request being addressed to a volume of the at least two pairs belonging to the consistency group and being received from an information processing apparatus coupled to at least one of the storage controllers.

15. A storage control method according to claim 14, further comprising the steps of performing, by at least one of the storage controllers, a write request addressed to a volume that is not in the consistency group before completion of splitting the at least two pairs in the consistency group.

16. A storage control method according to claim 14, wherein executing the suppressed write request addressed to the volume in the consistency group after the completion of splitting the at least two pairs in the consistency group.

17. A storage control method according to claim 14, wherein the at least two pairs in the consistency group are formed by primary volumes to be addressed from the information processing apparatus and secondary volumes to be updated with a copy data of a write data to be written to the primary volumes, respectively.

18. A storage control method according to claim 14, wherein the at least two pairs in the consistency group are sequentially split.

19. A system-storage control method according to claim 14, wherein the at least two pairs in the consistency group are split in a state in which synchronism is assured.

20. A storage control method according to claim 14, wherein two or more volumes in the at least two pairs in the consistency group become point-in-time copy volumes based on the completion of splitting the at least two pairs in the consistency group.

21. A computer program for a plurality of storage controllers stored on at least one computer readable storage medium and implemented in a system including the plurality of storage controllers and a plurality of storage devices, the computer program comprising:

code controlling forming a group with a plurality of first volumes provided by at least a portion of a plurality of first storage devices coupled to a first storage controller of the storage controllers and a plurality of second volumes provided by at least a portion of a plurality of second storage devices coupled to a second storage controller of the storage controllers;

code controlling starting to split a plurality of pairs of paired volumes in the group upon receiving a group split command for the group; and code controlling suppressing an execution of a write request, addressed to a volume in the group, received from the information processing apparatus after receiving the group split command, until a completion of splitting the pairs of the paired volumes in the group.

22. A computer program according to claim 21, further comprising:

code controlling executing a write request that is not addressed to a volume in the group during splitting the pairs of the paired volumes in the group.

23. A computer program according to claim 21, further comprising:

code controlling executing the suppressed write request addressed to the volume in the group after the completion of splitting the pairs of the paired volumes in the group.

24. A computer program according to claim 21, wherein the first volumes are primary volumes to be addressed from an information processing apparatus coupled to the first storage controller, and the second volumes are secondary volumes to be updated with a copy data of a write data to be written to the primary volumes.

25. A computer program according to claim 21, further comprising:

code controlling sequentially splitting the pairs of the paired volumes in the group.

26. A computer program according to claim 21, wherein the pairs of the paired volumes in the group are split in a state in which synchronism is assured.

27. A computer program according to claim 21, wherein the paired volumes in the group become point-in-time copy volumes based on the completion of splitting the pairs of the paired volumes in the group.

28. A computer program for a plurality of storage controllers stored on at least one computer readable storage medium and implemented in a system including the plurality of storage controllers and a plurality of storage devices, the computer program comprising:

code controlling forming a consistency group with a plurality of first volumes provided by a plurality of first storage devices coupled to a first storage controller of the storage controllers and a plurality of second volumes provided by a plurality of second storage devices coupled to a second storage controller of the storage controllers;

code controlling starting to split a plurality of pairs in the consistency group based on a group split command for the consistency group; and code controlling executing a write request after a completion of splitting the pairs in the consistency group, the write request being addressed to a volume in the consistency group, and being received from the information processing apparatus during splitting the pairs in the consistency group.

29. A computer program according to claim 28, wherein the first volumes are primary volumes to be addressed from an information processing apparatus coupled to the first storage controller, and the second volumes are secondary volumes to be updated with a copy data of a write data to be written to the primary volumes.

30. A computer program according to claim 28, further comprising:

code controlling sequentially splitting the pairs in the consistency group.

31. A computer program according to claim 28, wherein the pairs in the consistency group are split in a state in which synchronism is assured.

32. A computer program according to claim 28, wherein the second volumes become point-in-time copy volumes based on the splitting of the pairs in the consistency group.

33. A computer program according to claim 28, further comprising:

code controlling executing a write request addressed to a volume, which is not in the consistency group, during splitting the pairs in the consistency group.

34. A system including a plurality of storage controllers and a plurality of storage devices comprising:

a first storage controller of the storage controllers operatively coupled to an information processing apparatus and configuring a plurality of first volumes; and a second storage controller of the storage controllers configuring a plurality of second volumes, wherein the first and second storage controllers form a consistency group with the first volumes and the second volumes, wherein the first storage controller starts to split a plurality of pairs of paired volumes in the consistency group upon receiving a group split command, created by the information processing apparatus, for the consistency group, and wherein the first storage controller executes a write request after a completion of splitting the pairs of the paired volumes in the consistency group, the write request being addressed to a volume in the consistency group and being received from the information processing apparatus during splitting the pairs of paired volumes in the consistency group.

35. A system according to claim 34, wherein the first storage controller executes a write request, that is not addressed to a volume in the consistency group, during splitting the pairs of the paired volumes in the consistency group.

36. A system according to claim 34, wherein the first volumes are primary volumes to be addressed from the information processing apparatus, and the second volumes are secondary volumes to be updated with a copy data of a write data to be written to the primary volumes.

37. A system according to claim 34, wherein the first storage controller sequentially splits the pairs of the paired volumes in the consistency group.

38. A system according to claim 34, wherein the pairs of the paired volumes in the consistency group are split in a state in which synchronism is assured.

39. A system according to claim 34, wherein two or more volumes in the set of paired volumes become point-in-time copy volumes based on the completion of splitting the pairs of the paired volumes in the consistency group.

40. A system including a plurality of storage controllers and a plurality of storage devices comprising:

a first storage controller operatively coupled to an information processing apparatus and coupled to a plurality of first storage devices provided with a plurality of first volumes; and a second storage controller coupled to a plurality of second storage devices provided with a plurality of second volumes, wherein the first and second storage controllers form a consistency group with the first volumes and the second volumes, wherein the first storage controller starts to split a plurality of pairs in the consistency group upon receiving a group split command being created for the consistency group, wherein the first storage controller executes a write request after a completion of splitting the pairs, the write request being addressed to a volume in the consistency group and being received from the information processing apparatus during splitting the pairs in the consistency group, and wherein the first storage controller executes a write request addressed to a volume, which is not in the consistency group, during splitting the pairs in the consistency group.

41. A system according to claim 40, wherein the first volumes are primary volumes to be addressed from the information processing apparatus, and the second volumes are secondary volumes to be updated with a copy data of a write data to be written to the primary volumes.

42. A system according to claim 40, wherein the first storage controller sequentially splits the pairs in the consistency group.

43. A system according to claim 40, wherein the pairs in the consistency group are split in a state in which synchronism is assured.

44. A system according to claim 40, wherein the second volumes become point-in-time copy volumes based on the splitting of the pairs in the consistency group.

45. A storage control method comprising the steps of:

creating a plurality of pairs of volumes using a plurality of volumes;

forming, by a plurality of storage controllers, a consistency group by selecting at least two pairs based upon a group create command;

splitting, by at least one of the storage controllers, the at least two pairs in the consistency group after receiving a group split command for the consistency group; and executing, by at least one of the storage controllers, a write request after a completion of splitting the at least two pairs in the consistency group, the write request being addressed to a volume of the at least two pairs belonging to the consistency group and being received from an information processing apparatus coupled to at least one of the storage controllers during splitting the at least two pairs in the consistency group.

46. A storage control method according to claim 45, further comprising the steps of performing, by at least one of the storage controllers, a write request addressed to a volume that is not in the consistency group before the completion of splitting the at least two pairs in the consistency group.

47. A storage control method according to claim 45, wherein the at least two pairs in the consistency group are formed by primary volumes to be addressed from the information processing apparatus and secondary volumes to be updated with a copy data of a write data to be written to the primary volumes, respectively.

48. A storage control method according to claim 45, wherein the at least two pairs in the consistency group are sequentially split.

49. A storage control method according to claim 45, wherein the at least two pairs in the consistency group are split in a state in which synchronism is assured.

50. A storage control method according to claim 45, wherein two or more volumes of the at least two pairs in the consistency group become point-in-time copy volumes based on the completion of splitting the at least two pairs in the consistency group.

* * * * *